UNITED STATES PATENT OFFICE.

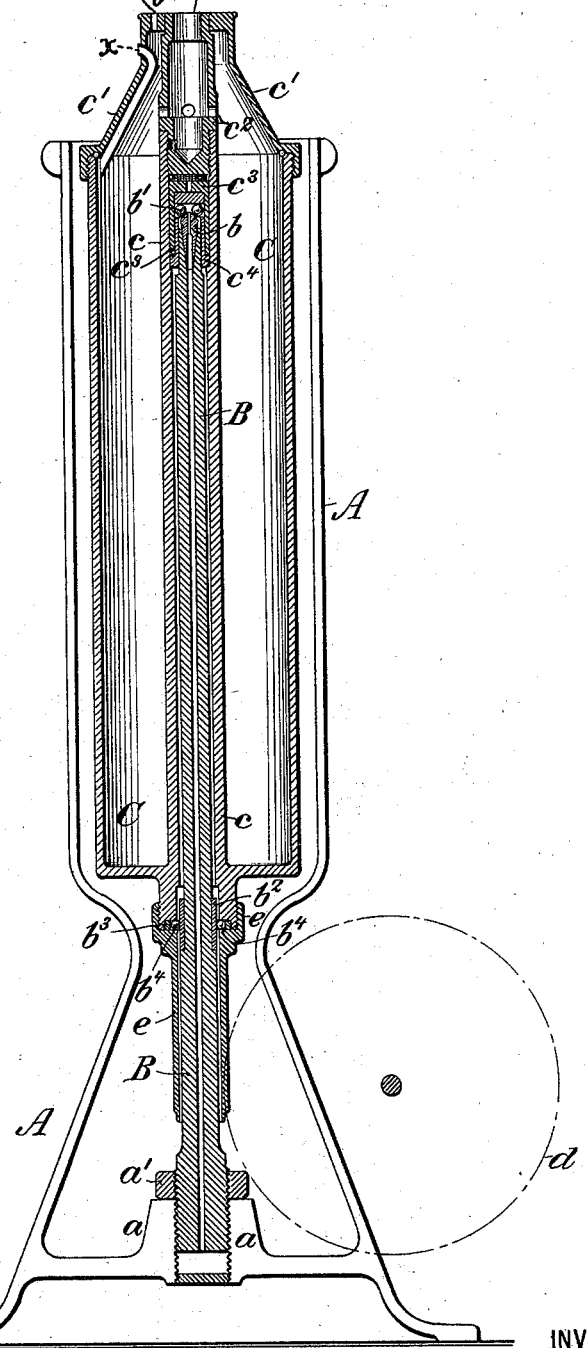

OLOF OHLSSON, OF NEWARK, NEW JERSEY.

CENTRIFUGAL MACHINE.

SPECIFICATION forming part of Letters Patent No. 573,910, dated December 29, 1896.

Application filed September 12, 1895. Serial No. 562,289. (No model.)

*To all whom it may concern:*

Be it known that I, OLOF OHLSSON, a citizen of the United States, and a resident of Newark, in the county of Essex and State of New Jersey, have invented a certain new and useful Improvement in Centrifugal Machines, of which the following is a specification.

My invention relates to the bowls of centrifugal machines and to the bearings for such bowls.

It has for its object to improve the construction of such bowls and their bearings and to make the running of such bowls safer and easier; and it consists in the devices hereinafter more particularly set forth, and recited in the claims at the end of this specification.

Heretofore the bowls of centrifugal machines have generally been mounted on spindles or shafts integral with the bowl or securely fastened thereto, the bearings of the bowl being arranged on such spindles or shafts, rotation being imparted to the bowls by means of driving mechanism connecting with such spindles or shafts. The defects inherent in such a construction are that the axes of the bowl and the spindle or shaft are apt to get out of true with each other, and if this happens or the spindle or shaft becomes bent the bowl will not rotate on its true axis but will be bodily swung around, the axis of such rotary movement not being coincident with the true axis of the bowl. Under such circumstances the bowl or its spindles or shafts are apt to break and fly apart. Moreover, with such a construction the spindle must necessarily be made of considerable length, thus increasing the dangers above referred to. Again, with such a construction only comparatively short bowls can be used, the height of the bowl being restricted within comparatively narrow limits.

In my improved device the spindle or support for the bowl is separate from the bowl, the rotary motion of the bowl being entirely independent of the spindle or support. The bearings upon which the bowl rests are directly in contact with the bowl itself on the line of the axis of the bowl, and the rotary motion is imparted to the bowl by means of driving mechanism connected directly with the bowl itself and not with the spindle or support.

In the ball-bearings for centrifugal machines or rotating parts of machines heretofore employed the balls either have been placed upon or supported by the fixed or stationary part of the mechanism or have been placed upon the revolving part only when the stationary part of the bearing surrounds the revolving part. The objection to this is that the spindle or shaft of the bowl often presses sidewise upon one of the balls with such force as to drive the ball around with the rotating spindle, at the same time also pushing the other balls ahead of the one in question, thereby greatly increasing the friction, or where the balls are placed upon an inner rotating member of the bearing the centrifugal force tends to hold the balls against the surrounding stationary part of the bearing, thereby increasing the friction. I have found that by placing the balls upon the outer revolving member of the bearing this difficulty is entirely obviated and the friction is materially lessened.

The drawing shows a centrifugal machine involving the preferred form of my improvement, those parts of the machine having no connection with my invention being omitted. It represents a cream-separator.

A forms the framework of the stand and the outer casing, within which the bowl C is placed.

B is the stationary spindle, which may be securely fixed in the base $a$ of the framework A of the machine, on which the bowl is supported and rotates. As it is shown in the drawing, it is screwed into the part $a$ and is secured by means of the nut $a'$. The bowl C has an interior annular in shape, the inner wall of which, $c$, constitutes the tubular shaft, which forms within the interior of the bowl and along the line of the axis of the bowl a cylindrical opening or space extending from the bottom of the bowl upward nearly the entire length of the bowl. This cylindrical space is a little larger than the spindle B. This space is left so that the bowl C can be put down over the spindle B, the bowl thereby being supported by the spindle. The bowl rests upon the bearings $b$ $b'$ and also $b^2$ $b^4$ of the spindle. These bearings are preferably ball-bearings. In the upper bearing the balls $b'$ are placed in the bowl portion of the bearing, and are supported by the annular shelf $c^4$, which forms part of the annular wall $c$ of the bowl. These balls bear upon the hardened-steel end $b$ of the spindle B, which sustains the weight of the bowl. The bearing $b$ $b'$ may therefore be termed the "supporting-bearing" for the bowl. $c^3$ is a hardened-steel lining forming part of the annular wall $c$. In the lower bearing the balls $b^4$ are also arranged on the bowl portion or member of the bearing in a recess in the lower extension of the bowl C, as shown in the drawing.

$b^2$ is an annular ring of hardened steel surrounding and secured to the spindle B and bearing against the balls $b^4$.

$b^3$ is a hardened-steel ring forming part of the extension $e$.

$e$ is a lower extension of the bowl or of the tubular shaft $c$, surrounding the spindle B, and may be made integral with the bowl or may be detachably secured, as shown in the drawing. This part supports the balls $b^4$.

$d$ represents the driving mechanism, which may be of any suitable kind. It engages in any suitable manner with the extension $e$ of the bowl, as, for instance, by the usual worm and worm-gear arrangement. Rotary motion is thus imparted directly to the bowl. Driving mechanism of any suitable kind may be used and may connect with the bowl or its extension in any suitable manner. Such driving mechanism not forming any part of my invention and being well known is not shown or described.

$c'$ is the cap usually employed in centrifugal bowls. The openings $c^2$ are inlets for the passage of the milk into the interior of the bowl C.

$x$ is the discharge-outlet for the skim-milk.

$y$ is the discharge-outlet for the cream.

The whole milk enters the machine at the top through the opening $n$, passes into the interior of the bowl through the inlets $c^2$, the skim-milk passing out through the skim-milk outlet $x$ and the cream passing out through the cream-outlet $y$.

In my improved device the spindle and the bowl are separate. The rotary motion of the bowl is independent of the spindle, the bearings being arranged on the bowl itself and on the line of its axis, and rotary motion is imparted from the driving mechanism directly to the bowl itself and not to the spindle.

In my improved device the bowl will always rotate upon its true axis, even if the spindle be bent. The danger of breakage is accordingly materially lessened, the bowl always runs smoothly and evenly, and it is self-balancing, always returning to its true position while rotating should it be forced therefrom for any reason.

The bowl may be made very much longer than under the old construction and the capacity of the bowl be thereby materially increased without in any way affecting the running of the machine. The spindle or support below the bowl may also be made much shorter than in any centrifugal bowls heretofore used.

By arranging the balls of the ball-bearings in the outer rotating member of the bearing a centrifugal motion is imparted to them, tending to take them away from the inner stationary member of the bearing, and there is accordingly no tendency for the pressure between any ball and the end $b$ or $b^2$ of the spindle to hold the ball and the spindle together. The friction of the bearing is thereby materially decreased over that present in ball-bearings where the balls are supported on the stationary member of the bearing or upon an inner revolving member of a bearing.

What I claim as new, and desire to secure by Letters Patent, is—

1. The combination with the bowl of a centrifugal machine having an inner wall surrounding a hollow space coincident with the axis of the bowl, of a stationary spindle adapted to fit loosely and freely along its length into said hollow space and bearings upon said spindle at its upper and lower ends for the support of the bowl, substantially as described.

2. The combination with the bowl of a centrifugal machine having an inner wall surrounding a hollow cylindrical space coincident with the axis of the bowl and extending nearly the entire length of the bowl, of a stationary spindle, independent of the bowl and adapted to fit loosely or freely along its length into said hollow space and to reach nearly to the top of the bowl, a bearing upon said spindle at the upper end for the support of the bowl and another bearing lower down on said spindle, and driving mechanism connected with the bowl, substantially as described.

3. The combination with the bowl C of a centrifugal machine, having an inner cylindrical wall $c$ surrounding a hollow cylindrical space extending nearly the length of the bowl and coincident with the axis of the bowl, of a stationary spindle B adapted to fit loosely or freely along its length into said space, ball-bearing $b$ $b'$ at the upper end of the spindle and ball-bearing $b^2$ $b^4$ near its lower end, and mechanism for driving the bowl, substantially as described.

4. The combination with the bowl of a centrifugal machine and a stationary spindle upon and around which it revolves, of a ball-bearing therefor, the balls of which are carried by the rotating bowl, substantially as described.

5. The combination with the bowl of a centrifugal machine having an inner wall surrounding a hollow space coincident with the axis of the bowl, of a stationary spindle adapted to fit loosely and freely along its length into said hollow space, bearings upon said spindle at its upper and lower ends for the support of the bowl, an extension of the bowl projecting along the stationary spindle beyond the end of the bowl and driving mechanism connecting with said extension, substantially as described.

In testimony whereof I have signed my name to this specification in the presence of two subscribing witnesses.

OLOF OHLSSON.

Witnesses:
EDWIN SEGER,
EDWARD J. MUSGRAVE.